(12) United States Patent
Du et al.

(10) Patent No.: US 9,574,066 B1
(45) Date of Patent: Feb. 21, 2017

(54) RUBBER COMPOSITION CONTAINING ALGAE OIL AND TIRE WITH COMPONENT

(71) Applicant: The Goodyear Tire & Rubber Company, Akron, OH (US)

(72) Inventors: Ling Du, Fairlawn, OH (US); David Andrew Benko, Munroe Falls, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/967,834

(22) Filed: Dec. 14, 2015

(51) Int. Cl.
| | |
|---|---|
| *C08L 9/00* | (2006.01) |
| *C08K 5/09* | (2006.01) |
| *C08K 3/04* | (2006.01) |
| *C08K 3/36* | (2006.01) |
| *C08K 9/02* | (2006.01) |
| *C08K 5/103* | (2006.01) |
| *A23D 9/02* | (2006.01) |
| *B60C 1/00* | (2006.01) |

(52) U.S. Cl.
CPC . *C08K 5/09* (2013.01); *C08K 3/04* (2013.01); *C08K 3/36* (2013.01); *C08K 9/02* (2013.01); *A23D 9/02* (2013.01); *B60C 1/00* (2013.01); *C08K 5/103* (2013.01); *C08L 9/00* (2013.01)

(58) Field of Classification Search
None
See application file for complete search history.

(56) References Cited

U.S. PATENT DOCUMENTS

| | | |
|---|---|---|
| 5,395,891 A | 3/1995 | Obrecht et al. |
| 5,672,639 A | 9/1997 | Corvasce et al. |
| 6,127,488 A | 10/2000 | Obrecht et al. |
| 6,133,364 A | 10/2000 | Obrecht et al. |
| 6,207,757 B1 | 3/2001 | Obrecht et al. |
| 6,242,534 B1 | 6/2001 | Obrecht et al. |
| 6,372,857 B1 | 4/2002 | Obrecht et al. |
| 2004/0127617 A1 | 7/2004 | Vasseur et al. |
| 2005/0145312 A1 | 7/2005 | Herberger et al. |
| 2013/0289183 A1 | 10/2013 | Kerns et al. |
| 2014/0357746 A1* | 12/2014 | Ngantung ............... C08G 18/14 521/129 |

FOREIGN PATENT DOCUMENTS

| | | | |
|---|---|---|---|
| EP | 1134254 A1 | | 9/2001 |
| JP | 2013144771 A | * | 7/2013 |
| JP | 2014019856 A | * | 2/2014 |
| WO | WO 2016105931 A1 | * | 6/2016 ............... C12P 7/64 |

OTHER PUBLICATIONS

Maghraby, D. M. E. et al., "Lipid content and fatty acid composition of Mediterranean macro-algae as dynamic factors for biodiesel production", Oceanologia 2015, 57, 86-92.*

Lang, I. et al., "Fatty acid profiles and their distribution patterns in microalgae: a comprehensive analysis of more than 2000 strains from the SAG culture collection", BMC Plant Biology 2011, 11, 124.*

* cited by examiner

*Primary Examiner* — Richard A Huhn
(74) *Attorney, Agent, or Firm* — Henry C. Young, Jr.

(57) ABSTRACT

This invention relates to a rubber composition comprised of at least one conjugated diene-based elastomer containing triglyceride based algae oil and to a tire with a component thereof.

20 Claims, No Drawings

RUBBER COMPOSITION CONTAINING ALGAE OIL AND TIRE WITH COMPONENT

FIELD OF THE INVENTION

This invention relates to a rubber composition comprised of at least one conjugated diene-based elastomer containing triglyceride based algae oil and to a tire with a component thereof.

BACKGROUND OF THE INVENTION

Rubber compositions are often desired for tire components where one or more of uncured rubber processability and cured rubber composition properties are promoted. For example, pneumatic rubber tires are often used for purposes where traction, particularly cold weather traction, and resistance to treadwear are important considerations.

This requires tread rubber compositions which provide the desired good grip, or traction, under cold weather conditions yet also provide good rolling resistance for fuel economy and good resistance to treadwear, or abrasion resistance, for extended tire service life.

Triglycerides are main constituents of plant derived oils which are esters formed from glycerol (a trihydric alcohol containing three hydroxyl groups) and three fatty acid groups.

Algae oil (oil contained within the algae cell and recovered after cell rupture) is comprised of mixed saturated, mono-unsaturated and polyunsaturated triglyceride esters of fatty acids. Algae oil triglyderides are primarily comprised of mono-unsaturated triglyceride esters, particularly from fatty acids (fatty acid components) comprised primarily of oleic acid (e.g. 80 percent of the algae oil). It is contemplated that such triglyceride ester based algae oil might promote a combination of improved uncured rubber processing for rubber compositions containing diene-based elastomer(s) because of its high concentration of mono-unsaturation and also might promote various improved cured rubber properties in a sense of the algae oil becoming co-sulfur cured with the diene-based elastomers of the rubber composition. It is therefore desired to evaluate use of algae oil in rubber compositions containing diene-based elastomer(s) for which reinforcing filler for the rubber composition is at least one of rubber reinforcing carbon black and precipitated silica. In one embodiment, at least one of such diene-based elastomers may be a functionalized styrene/butadiene elastomer or functionalized cis 1,4-polybutadiene containing at least one functional group reactive with hydroxyl groups (e.g. silanol groups) contained on the precipitated silica reinforcing filler to aid in promoting precipitated silica reinforcement of the rubber composition.

For such evaluation, it is important to appreciate that the triglyceride ester based algae oil is chemically differentiated from petroleum (hydrocarbon) based oils, as well as from other types of plant derived oils, in a sense that the algae oil contains a significant degree of mono-unsaturation (from oleic acid) and is clearly not a linear or an aromatic petroleum based oil.

Such high oleic acid component-based triglyceride oil from algae is also chemically differentiated from more simple synthetic oleic acid based triglyceride in a sense of containing a primary oleic acid component content together with a balance of a minor content of combination of di-unsaturated and mono-unsaturated fatty acid components, particularly linoleic and palmitic fatty acids.

The chemical composition of algae oil may be determined by gas chromatographic (GC) analysis according to ASTM D5974. For the gas chromatographic analysis (GC analysis), the triglycerides of the algae are converted into fatty acid methyl esters by reflux in an acidic methanol-toluene azeotrope before the GC analysis. Gas chromatographic analysis of the fatty acid methyl esters from the algae conversion shows the high degree of mono-unsaturation and particularly a high content of tri-mono-unsaturated fatty acid component(s) of the triglyceride ester based algae oil. For informational purposes to illustrate the aforesaid relative mono-unsaturated and di-unsaturated fatty acid components for the triglyceride ester based algae oil evaluated herein and soybean oil, the following Table A is provided.

TABLE A

| Fatty acid component of triglyceride esters | Algae Oil | Soybean Oil |
|---|---|---|
| Oleic acid, (mono-unsaturated fatty acid) | 87% | 27% |
| Linoleic acid, (di-unsaturated fatty acid) | 1.5% | 38% |
| Palmitic acid | 3.6% | 10% |
| Stearic acid | 3% | 4% |

Therefore, the triglyceride based algae oil contains a very high content of mono-unsaturated oleic fatty acid component of the triglyceride esters (e.g. at least 80 percent) and minor content of di-unsaturated linoleic acid component of the triglyceride (e.g. from about 1 to about 5 percent). In contrast, the triglyceride ester based soybean oil contains a significant content of di-unsaturated linoleic acid component (e.g. at least about 30 percent). Further, such high mono-unsaturation content of the fatty acid component of the triglyceride ester based algae oil is not present in petroleum based rubber processing oil and is not seen in the triglyceride based soybean oil.

The challenge of combining such high mono-unsaturated triglyceride based algae oil for use as a rubber processing oil instead of and in contrast to petroleum based oil with diene based elastomers with reinforcing filler containing precipitated silica in an internal rubber mixer (e.g. Banbury™ mixer) is to be evaluated with results being unknown until such evaluation is undertaken.

In the description of this invention, the terms "compounded" "rubber compositions" and "compounds", where used, refer to rubber compositions which have been compounded, or blended, with appropriate rubber compounding ingredients. The terms "rubber", "polymer" and "elastomer" may be used interchangeably unless otherwise indicated. The amounts of materials are usually expressed in parts of material per 100 parts of rubber by weight (phr).

SUMMARY AND PRACTICE OF THE INVENTION

In accordance with this invention, a rubber composition is provided comprised of, based on parts by weight per 100 parts by weight of elastomer (phr):

(A) at least one conjugated diene-based elastomer, (B) from about 5 to about 60, alternately from about 10 to about 40, phr of triglyceride ester based algae oil where fatty acid components of said triglyceride ester based algae oil comprise:

(1) about 80 to about 95 percent mono-unsaturated oleic acid component, (2) about 1 to about 5 percent di-unsaturated linoleic acid component, (3) about 2 to about 6 percent palmitic acid component, (4) about 1 to about 6 percent of stearic acid component, (C) from about 30 to about 140, alternately from about 50 to about 120 phr of reinforcing filler comprised of:
(1) rubber reinforcing carbon black, or
(2) combination of rubber reinforcing carbon black and precipitated silica (containing, for example, about 20 to about 90 weight percent of precipitated silica, alternately from about 55 to about 90 weight percent precipitated silica, for a silica-rich reinforcing filler).0

In one embodiment, the complex triglyceride ester of said algae oil is exclusive of synthetic triglyceride ester and the complex triglyceride algae oil is exclusive of synthetic triglyceride oil.

It is important to appreciate that such triglyceride ester algae oil is derived from a naturally occurring organism, namely algae, with a consequential balance of mono- and di-unsaturated fatty acid based components in contrast to being a synthetic oleic acid based triglyceride ester.

Accordingly, such complex triglyceride ester algae oil is considered as being in contrast to and exclusive of a synthetic triglyceride ester which contains an oleic acid component.

The precipitated silica (synthetic amorphous precipitated silica) may be provided as:

(A) a precipitated silica hydrophobated by reaction in situ within the rubber composition with a silica coupling agent reactive with hydroxyl groups (e.g. silanol groups) on said precipitated silica and another different moiety interactive with carbon-to-carbon double bonds of said conjugated diene-based elastomers, or (B) a pre-hydrophobated precipitated silica (pre-hydrophobated prior to its addition to the rubber composition comprised of having been hydrophobated by reaction of precipitated silica with a silica coupling agent reactive with hydroxyl groups (e.g. silanol groups) on said precipitated silica and another different moiety interactive with carbon-to-carbon double bonds of a conjugated diene-based elastomer.

In one embodiment, the rubber composition is free of petroleum based rubber processing oil.

In one embodiment, at least one of said diene-based elastomers is a functionalized diene-based elastomer, which contains, for example, at least one functional group comprised of at least one of amine, siloxy, carboxyl, hydroxyl groups, and thiol groups, which may include, for example, a combination of siloxy and thiol groups as being functional groups which are reactive with hydroxyl groups (e.g. silanol groups) contained on precipitated silica. In one embodiment, the functionalized diene-based elastomer is at least one of styrene/butadiene rubber and cis 1,4-polybutadiene rubber, desirably a styrene/butadiene rubber.

In one embodiment, said functionalized diene-based elastomer is end-chain functionalized rather than being in-chain functionalized.

In one embodiment, at least one of said diene-based elastomers may be a tin coupled, or silicon coupled, particularly tin coupled, elastomer (e.g. styrene/butadiene elastomer). Such coupled elastomer may, for example, be used to promote a beneficial improvement (reduction) in tire treadwear and a beneficial reduction in tire rolling resistance when used in tire tread rubber compositions. Such tin coupled styrene/butadiene elastomer may be prepared, for example, by coupling the elastomer with a tin coupling agent at or near the end of the polymerization used in synthesizing the elastomer. In the coupling process, live polymer chain ends react with the tin coupling agent, thereby coupling the elastomer. For example, up to four live polymer chain ends can react with tin tetrahalides, such as tin tetrachloride, thereby coupling the polymer chains together.

The coupling efficiency of the tin coupling agent is dependent on many factors, such as the quantity of live chain ends available for coupling and the quantity and type of polar modifier, if any, employed in the polymerization. For instance, tin coupling agents are generally not as effective in the presence of polar modifiers. However, polar modifiers such as tetramethylethylenediamine, are frequently used to increase the glass transition temperature of the rubber for improved properties, such as improved traction characteristics in tire tread compounds. Coupling reactions that are carried out in the presence of polar modifiers typically have a coupling efficiency of about 50 to 60 percent in batch processes.

In cases where the tin coupled elastomer will be used in rubber compositions that are loaded primarily with carbon black reinforcement, the coupling agent for preparing the elastomer may typically be a tin halide. The tin halide will normally be a tin tetrahalide, such as tin tetrachloride, tin tetrabromide, tin tetrafluoride or tin tetraiodide. However, mono-alkyl tin trihalides can also optionally be used. Polymers coupled with mono-alkyl tin trihalides have a maximum of three arms. This is, of course, in contrast to elastomers coupled with tin tetrahalides which have a maximum of four arms. To induce a higher level of branching, tin tetrahalides are normally preferred. The tin tetrachloride is usually the most preferred.

In cases where the coupled elastomer may be used in compounds that are loaded with high levels of silica, the coupling agent for preparing the elastomer may, if desired, be a silicon halide. The silicon-coupling agents that can be used will normally be silicon tetrahalides, such as silicon tetrachloride, silicon tetrabromide, silicon tetrafluoride or silicon tetraiodide. However, mono-alkyl silicon trihalides can also optionally be used. Elastomers coupled with silicon trihalides have a maximum of three arms. This is, of course, in contrast to elastomers coupled with silicon tetrahalides during their manufacture which have a maximum of four arms. To induce a higher level of branching, if desired, of the elastomer during its manufacture, silicon tetrahalides are normally preferred. In general, silicon tetrachloride is usually the most desirable of the silicon-coupling agents for such purpose.

Representative examples of various diene-based elastomers are, for example, at least one of cis 1,4-polyisoprene, cis 1,4-polybutadiene, isoprene/butadiene, styrene/isoprene, styrene/butadiene and styrene/isoprene/butadiene elastomers. Additional examples of elastomers which may be used include 3,4-polyisoprene rubber, carboxylated rubber, silicon-coupled and tin coupled star-branched elastomers. Often desired rubber or elastomers are cis 1,4-polybutadiene, styrene/butadiene rubber and cis 1,4-polyisoprene rubber.

Such precipitated silicas may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

Various commercially available precipitated silicas may be used, such as, only for example herein, and without limitation, silicas from PPG Industries under the Hi-Sil trademark with designations 210, 243, etc., silicas from Solvay with, for example, designations of Z1165MP and Z165GR, silicas from Evonik with, for example, designations VN2 and VN3 and chemically treated precipitated silicas such as for example Agilon™ 400 from PPG.

Representative examples of rubber reinforcing carbon blacks are, for example, and not intended to be limiting, those with ASTM designations of N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may have iodine absorptions ranging from, for example, 9 to 145 g/kg and DBP numbers ranging from 34 to 150 cc/100 g.

Other fillers may be used in the vulcanizable rubber composition including, but not limited to, particulate fillers comprised of at least one of clay, exfoliated clay, graphene, metal oxides, carbon nanotubes, as well as ultra high molecular weight polyethylene (UHMWPE) and particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639. One or more of such fillers, as well as other fillers, may be used in an amount ranging, for example, from about 1 to about 20 phr.

Representative of aforesaid silica coupling agents are comprised of, for example:

(A) bis(3-trialkoxysilylalkyl) polysulfide containing an average in range of from about 2 to about 4, optionally an average of from 2 to about 2.6, sulfur atoms in its connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

It is readily understood by those having skill in the art that the vulcanizable rubber composition would be compounded by methods generally known in the rubber compounding art, such as, for example, mixing various additional sulfur-vulcanizable elastomers with said diene-based elastomer containing rubber composition and various commonly used additive materials such as, for example, sulfur and sulfur donor curatives, sulfur vulcanization curing aids, such as activators and retarders and processing additives, resins including tackifying resins and plasticizers, fillers such as rubber reinforcing fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of tackifier resins, if used, may comprise, for example, about 0.5 to about 10 phr, usually about 1 to about 5 phr. Typical amounts of processing aids comprise about 1 to about 50 phr. Additional petroleum based rubber process oils, if desired, may be added in very low levels during the blending of the rubber composition in addition to the algae rubber processing oil as the major portion of the processing oil (e.g. greater than 50 percent of the rubber processing oil) or as the only rubber processing oil. The additional petroleum based or derived rubber processing oils may include, for example, aromatic, paraffinic, naphthenic, and low PCA oils such as MEW, TDAE and heavy naphthenic, although low PCA oils might be preferred. Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Often desirably the primary accelerator is a sulfenamide. If a second accelerator is used, the secondary accelerator is often desirably a guanidine such as for example a diphenylguanidine, a dithiocarbamate or a thiuram compound.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The vulcanizable rubber composition containing the algae oil as a rubber processing oil may be incorporated in a variety of rubber components of an article of manufacture such as, for example, a tire. For example, the rubber component for the tire is a tread.

The pneumatic tire of the present invention may be a race tire, passenger tire, aircraft tire, agricultural tire, earthmover tire, off-the-road tire, truck tire and the like. Usually desirably the tire is a passenger or truck tire. The tire may also be a radial or bias ply tire, with a radial ply tire being usually desired.

Vulcanization of the pneumatic tire of the present invention is generally carried out at conventional temperatures in a range of, for example, from about 140° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Analysis of Algae Oil and Soybean Oil

The algae oil for this invention may be obtained, for example, after fermentation in which the algae are fed sugar and other ingredients in a fermentation tank. After algae growth is complete, the algae are dried and then pressed to release the algae oil.

Chemical compositions of such algae oil and soybean oil may be analyzed by gas chromatography (GC). The preparation of the two oil samples to measure their fatty acid contents are undertaken. For such analysis, 50 mg of sample are placed into a 125 ml flat-bottom flask long with 3 mg of an internal standard pentadecanoic acid. The material is refluxed for 16 hours with acidic methanol-toluene azeotrope. An extract therefrom is neutralized with a saturated solution of sodium bicarbonate. Fatty acid methyl esters are extracted with methylene chloride using an extraction funnel. The extracts are dried with sodium sulfate and diluted to 25 ml. A calibration standard is prepared with 3 mg comprised of each of the following fatty acids (for an internal gas chromatographic standard): myristic, pentadocanoic, palmitic, stearic, oleic, linoleic and arachidic acids. A sample of the comparison extracts is injected into a gas chromatograph for the gas chromatographic analysis.

Results of the GC analysis are reported the following Table B for the detected fatty acids and thereby the fatty acid component contents of the triglycerides.

TABLE B

| Fatty Acid Detected | Algae Oil (%) | Soybean Oil (%) |
| --- | --- | --- |
| Myristic | 0.5 | 0 |
| Palmitic | 3.6 | 9.5 |
| Stearic | 3 | 4.2 |
| Oleic (mono-unsaturated) | 86.6 | 27.2 |
| Linoleic (di-unsaturated) | 1.5 | 37.8 |
| Linolenic (tri-unsaturated) | 0 | 3.6 |
| Other fatty acids | 0.5 | 14.7 |
| Total fatty acids (rounded total values) | 96 | 97 |

It is readily seen that such recovered algae oil is comprised of a very high mono-unsaturated oleic acid content with a minor content of linoleic acid and palmitic acid.

The following evaluative examples are presented for the purposes of illustrating and not limiting the present invention. All parts and percentages are parts by weight, usually parts by weight per 100 parts by weight rubber (phr) unless otherwise indicated.

EXAMPLE I

In this example, the effect of using an algae oil was evaluated for use as a triglyceride based processing oil for a rubber composition as compared to petroleum based processing oil and also compared to use of triglyceride based soybean oil. For this Example, the rubber compositions evaluated were a 70/30 blend of functionalized solution polymerization prepared styrene/butadiene rubber (S-SBR) and high cis-polybutadiene rubber (PBD).

Rubber Sample A was a Control which contained petroleum based rubber processing oil.

Experimental rubber Sample B contained the triglyceride based algae oil.

Comparative rubber Sample C contained triglyceride based soybean oil.

The rubber Samples were prepared by mixing the elastomers with reinforcing fillers comprised of rubber reinforcing carbon black and precipitated silica together with a silica coupling agent for the precipitated silica.

The sulfur curative combination of sulfur and cure accelerator content for the algae oil and soybean oil containing rubber compositions was increased by about 10 percent to compensate for their otherwise slower cure rate.

For such preparation, ingredients, other than sulfur and sulfur accelerator curatives, were mixed a first non-productive mixing stage (NP1) in an internal rubber mixer for about 4 minutes to a temperature of about 160° C. The resulting mixture was subsequently mixed in a second sequential non-productive mixing stage (NP2) in an internal rubber mixer to a temperature of about 160° C. with no additional ingredients added. The rubber composition was subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

The basic formulation for the Control rubber Sample A, Experimental rubber Sample B and Comparative rubber Sample C are presented in the following Table 1 expressed in parts by weight per 100 parts of rubber (phr) unless otherwise indicated.

TABLE 1

| | Parts by weight (phr) |
| --- | --- |
| Non-Productive Mixing Stages (NP1 plus NP2) | |
| Cis 1,4-polybutadiene rubber (PBD)[1] | 30 |
| Styrene/butadiene rubber (S-SBR)[2] | 70 |
| Precipitated silica[3] | 65 |
| Silica coupler (coupling agent)[4] | 5.2 |
| Petroleum based rubber processing oil[5] | 20 or 0 |
| Algae oil[6] | 20 or 0 |
| Soybean oil[7] | 20 or 0 |
| Carbon black[8] | 4 |
| Zinc oxide | 4 |
| Fatty acid[9] | 2 |

TABLE 1-continued

| | Parts by weight (phr) |
|---|---|
| Productive Mixing Stage (P) | |
| Sulfur | 1.7 and 1.9 |
| Sulfur cure accelerator(s)[10] | 2 and 3 |

[1]Cis-polybutadiene rubber as BUD1207 ™ from The Goodyear Tire & Rubber Company
[2]Styrene/butadiene, solution polymerization prepared, functionalized copolymer rubber as SLR 4602 ™ from Trinseo, understood to be a tin coupled styrene/butadiene elastomer containing end siloxy functional groups reactive with hydroxyl groups of precipitated silica
[3]Precipitated silica as Zeosil Z1165 MP from Solvay
[4]Silica coupler as Si266 ™ from Evonik, comprised of a bis (3-triethoxysilylpropyl) polysulfide containing an average of from about 2 to about 2.6 connecting sulfur atoms in its polysulfidic bridge
[5]Petroleum based rubber processing oil as Naprex 38 from ExxonMobil Company
[6]Algae oil triglyceride, namely a plant-derived triglyceride oil with primarily mono-unsaturated oleic fatty acid component as Oleic Microalgae Oil ™ from Solazyme, containing about 87 percent oleic acid, about 2 percent linoleic acid, about 4 percent palmitic acid and about 3 percent stearic acid components
[7]Soybean oil triglyceride with combination of mono-unsaturated oleic fatty acid and di-unsaturated linoleic fatty acid components as Soybean Oil from Cargill Dressings
[8]N550 rubber reinforcing carbon black, an ASTM identification
[9]Fatty acid primarily comprised of stearic, palmitic and oleic acids
[10]Sulfenamide and diphenylguanidine sulfur cure accelerators The following Table 2 illustrates cure behavior and various physical properties of rubber Control rubber Sample A (petroleum oil containing), Experimental rubber Sample B (algae oil containing) and Comparative rubber Sample C (soybean oil containing) based upon the basic formulation of Table 1. Where cured rubber samples are examined, such as for the toughness and hot rebound values, the rubber samples were cured for about 14 minutes at a temperature of about 160° C.

TABLE 2

| | Parts (phr) | | |
|---|---|---|---|
| Rubber Samples | Control A | Experimental B | Comparative C |
| Polybutadiene rubber | 70 | 70 | 70 |
| Functionalized styrene/butadiene rubber | 30 | 30 | 30 |
| Precipitated silica | 65 | 65 | 65 |
| Petroleum processing oil | 20 | 0 | 0 |
| Algae oil | 0 | 20 | 0 |
| Soybean oil | 0 | 0 | 20 |
| Sulfur | 1.7 | 1.9 | 1.9 |
| Sulfur cure accelerators | 2 | 3 | 3 |
| Processability | | | |
| G', 0.83 Hz, 100° C., 15% strain (MPa) Wet Traction Indication (for Tread Running Surface) - Lower is Better | 0.23 | 0.23 | 0.25 |
| Cold (0° C.) rebound value (%) Winter (Snow) Performance Indication - Lower is Better | 20 | 21 | 21 |
| Dynamic modulus E' at −20° C. (MPa) Abrasion Resistance (Wear Resistance Indicator) - Lower is Better | 35 | 24 | 26 |
| Grosch[1] rate of abrasion (mg/km), high severity (70N), 16° slip angle, disk speed = 20 km/hr, distance = 500 m Rolling Resistance (Hysteresis) Indication | 599 | 489 | 524 |
| Rebound (23° C.) value (%), (higher is better) | 48 | 50 | 48 |
| Rebound (100° C.) value (%), (higher is better) | 67 | 68 | 65 |
| Tan delta (100° C.), 10% strain, 11 Hz (lower is better) | 0.103 | 0.096 | 0.104 |
| Tear strength[2] 95° C. (N) (higher is better) | 79 | 79 | 71 |

TABLE 2-continued

| | Parts (phr) | | |
|---|---|---|---|
| Rubber Samples | Control A | Experimental B | Comparative C |
| Toughness | | | |
| Tensile strength (MPa) | 16 | 17 | 17 |
| Elongation at break (%) | 415 | 418 | 456 |

[1]Grosch abrasion rate determination on an LAT-100 Abrader and measured in terms of mg/km of rubber abraded away. The test rubber sample is placed at a slip angle under constant load (Newtons) as it traverses a given distance on a rotating abrasive disk (disk from HB Schleifmittel GmbH). A high severity test is conducted at a load of 70 Newtons, a slip angle of 12 degrees and a disk speed of 20 km/hr and a sample travel distance of 250 meters.
[2]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

As seen in Table 2, the results show the benefit of use of the triglyceride based algae oil in Experimental rubber Sample B, when used instead of the petroleum based rubber processing oil of Control rubber Sample A and compared to use of triglyceride based soybean oil for rubber Sample C.

For example, while the toughness, wet traction indicator and tear strength values were similar, the hysteresis value was somewhat improved and the abrasion resistance (Grosch rate of abrasion loss for the cured rubber compositions) was significantly improved (rate of abrasion loss significantly reduced) from a value of 599 mg/km for Control rubber Sample A, using the petroleum based oil, (and from a value of 524 mg/km for comparative rubber Sample C using the soybean oil), to a significantly lower value of 489 mg/km for Experimental rubber Sample B using the triglyceride based algae oil.

Further, it is seen that predictive winter performance was significantly improved for Experimental rubber Sample B by use of the triglyceride based algae oil instead of the petroleum based rubber processing oil used for Control rubber Sample A. The winter performance is also seen to be improved for Experimental rubber Sample B by use of the triglyceride based algae oil instead of the triglyceride based soybean oil for Comparative rubber Sample C.

Therefore, it is concluded that this evaluation has successfully demonstrated a beneficial significant discovery of use of triglyceride based algae oil instead of the petroleum based processing oil as a combination of processing additive and cure property enhancement for the rubber composition. In one aspect, the evaluation demonstrated a discovery that a combination of beneficial reduction in abrasion loss can be achieved and predictive winter performance can be improved for the cured rubber composition without reducing processability of the uncured rubber composition and without sacrificing significant cured rubber properties.

It is further concluded that such discovery can extend to use of algae oil compared to use of soybean oil.

EXAMPLE II

In this example, the effect of using a triglyceride based algae oil was evaluated for use as a processing oil for a rubber composition instead of petroleum based processing oil and also compared to use of triglyceride based soybean oil. For this Example, the rubber compositions are based on natural cis 1,4-polyisoprene rubber.

Rubber Sample D was a Control rubber Sample which contained petroleum based rubber processing oil.

Experimental rubber Sample E contained triglyceride based algae oil.

Comparative rubber Sample F contained triglyceride based soybean oil.

The rubber Samples were prepared by mixing the elastomers with reinforcing fillers comprised of rubber reinforcing carbon black and precipitated silica together with a silica coupling agent for the precipitated silica.

As in Example I, the sulfur/cure accelerator contents for the algae and soybean oil containing rubber compositions was increased about 10 percent to allow for their otherwise slower cure rate.

For such preparation, ingredients, other than sulfur and sulfur accelerator curatives, were mixed in a first non-productive mixing stage (NP1) in an internal rubber mixer for about 4 minutes to a temperature of about 160° C. The resulting mixture was subsequently mixed in a second sequential non-productive mixing stage (NP2) in an internal rubber mixer to a temperature of about 160° C. with no additional ingredients added. The rubber composition was subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

The basic formulation for the Control rubber Sample D, Experimental rubber Sample E and Comparative rubber Sample F are presented in the following Table 3 expressed in parts by weight per 100 parts of rubber (phr) unless otherwise indicated.

TABLE 3

| | Parts by weight (phr) |
|---|---|
| Non-Productive Mixing Stages (NP1 plus NP2) | |
| Natural cis 1,4-polyisoprene rubber | 100 |
| Carbon black (N550) | 65 |
| Petroleum based rubber processing oil | 10 or 0 |
| Algae oil | 10 or 0 |
| Soybean oil | 10 or 0 |
| Zinc oxide | 3 |
| Fatty acid | 1 |
| Productive Mixing Stage (P) | |
| Sulfur | 1.4 and 1.5 |
| Sulfur cure accelerators | 1.1 and 1.2 |

Other than the natural cis 1,4-polyisoprene rubber, the above ingredients were the same as the ingredients reported in Table 1 of Example I.

The following Table 4 illustrates cure behavior and various physical properties of rubber Control rubber Sample D (petroleum oil containing), Experimental rubber Sample E (triglyceride based algae oil containing) and Comparative rubber Sample F (triglyceride based soybean oil containing) based upon the basic formulation of Table 3. Where cured rubber samples are examined, such as for the toughness and hot rebound values, the rubber samples were cured for about 14 minutes at a temperature of about 160° C.

TABLE 4

| | Parts (phr) | | |
|---|---|---|---|
| Rubber Samples | Control D | Experimental E | Comparative F |
| Cis 1,4-polyisoprene rubber | 100 | 100 | 100 |
| Carbon black (N550) | 65 | 65 | 65 |
| Petroleum processing oil | 10 | 0 | 0 |
| Algae oil | 0 | 10 | 0 |
| Soybean oil | 0 | 0 | 10 |
| Sulfur | 1.4 | 1.5 | 1.5 |
| Sulfur cure accelerators | 1.1 | 1.2 | 1.2 |
| Processability (0.83 Hz, 100° C., 15% strain (MPa) | 0.24 | 0.26 | 0.25 |
| Wet Traction Indication (For Tread Running Surface) - Lower Is Better | | | |
| Cold (0° C.) rebound value (%) Winter (Snow) Performance Indication - Lower is Better | 25 | 26 | 26 |
| Dynamic modulus E' at −20° C. (MPa) Abrasion Resistance (Wear Resistance Indicator) - Lower is Better | 58 | 49 | 51 |
| Grosch[1] rate of abrasion (mg/km), high severity (70N), 16° slip angle, disk speed = 20 km/hr, distance = 500 m Rolling Resistance (Hysteresis) Indication | 742 | 692 | 740 |
| Rebound (23° C.) value (%) (higher is better) | 40 | 39 | 41 |
| Rebound (100° C.) value (%) (higher is better) | 51 | 52 | 52 |
| Tan delta (100° C.), 10% strain, 11 Hz (lower is better) Toughness | 0.183 | 0.189 | 0.186 |
| Tensile strength (MPa) | 19.2 | 19.5 | 18.2 |
| Elongation at break (%) | 411 | 418 | 412 |

As seen in Table 4, the results demonstrate a benefit of use of the triglyceride based algae oil in Experimental rubber Sample E, when used instead of the petroleum based rubber processing oil of Control rubber Sample D and compared to use of triglyceride based soybean oil for rubber Sample F.

For example, while the toughness, wet traction indicator and hysteresis values were similar, the abrasion resistance (Grosch rate of abrasion loss for the cured rubber compositions) was significantly improved (rate of abrasion loss significantly reduced) from a value of 742 mg/km for Control rubber Sample D using the rubber processing oil (and from a value of 740 mg/km for comparative rubber Sample F using the soybean oil), to a significantly lower value of 692 mg/km for Experimental rubber Sample E using the algae oil.

Further, it is seen that predictive winter performance was significantly improved for Experimental rubber Sample E by use of the triglyceride based algae oil instead of the petroleum based rubber processing oil used for Control rubber Sample D. The predicted winter performance for Experimental rubber Sample E where algae oil is used is seen to be slightly better than Comparative rubber Sample F where soybean oil was used.

Therefore, it is concluded that this evaluation has successfully demonstrated a beneficial, significant discovery of use of triglyceride based algae oil instead of the petroleum based processing oil as a combination of processing additive and cure property enhancement for the rubber composition. In one aspect, the evaluation demonstrated a discovery that a combination of beneficial reduction in abrasion loss can be achieved together with an improvement in predictive winter performance for the cured rubber composition without reducing processability of the uncured rubber composition and without sacrificing significant cured rubber properties.

It is further concluded that such discovery of beneficial reduction in abrasion loss can extend to use of triglyceride based algae oil compared to use of triglyceride based soybean oil.

While certain representative embodiments and details have been shown for the purpose of illustrating the subject invention, it will be apparent to those skilled in this art that various changes and modifications can be made therein without departing from the scope of the subject invention.

What is claimed is:

1. A rubber composition comprised of, based on parts by weight per 100 parts by weight of elastomer (phr):
   (A) at least one conjugated diene-based elastomer, and
   (B) from about 5 to about 60 phr of triglyceride ester based algae oil, wherein fatty acid components of said triglyceride ester of said algae oil comprise:
      (1) about 80 to about 95 percent mono-unsaturated oleic acid component,
      (2) about 1 to about 5 percent di-unsaturated linoleic acid component,
      (3) about 2 to about 6 percent palmitic acid component,
      (4) about 2 to about 6 percent stearic acid component, and
   (C) from about 30 to about 140 phr of reinforcing filler comprised of:
      (1) rubber reinforcing carbon black, or
      (2) combination of rubber reinforcing carbon black and precipitated silica,
   (D) silica coupling agent reactive with hydroxyl groups contained on said precipitated silica and another different moiety interactive with carbon-to-carbon double bonds of said conjugated diene-based elastomers.

2. The rubber composition of claim 1 wherein said triglyceride ester based algae oil is exclusive of synthetic triglyceride.

3. The rubber composition of claim 1 wherein the precipitated silica is provided as:
   (A) a precipitated silica hydrophobated by reaction in situ within the rubber composition with a silica coupling agent reactive with hydroxyl groups on said precipitated silica and another different moiety interactive with carbon-to-carbon double bonds of said conjugated diene-based elastomers, or
   (B) a pre-hydrophobated precipitated silica as a precipitated silica hydrophobated by reaction of the precipitated silica with a silica coupling agent reactive with hydroxyl groups on said precipitated silica and another different moiety interactive with carbon-to-carbon double bonds of a conjugated diene-based elastomer.

4. The rubber composition of claim 1 wherein said rubber composition is free of petroleum based rubber processing oil.

5. The rubber composition of claim 1 wherein said reinforcing filler is comprised of rubber reinforcing carbon black.

6. The rubber composition of claim 1 wherein the reinforcing filler is comprised of a combination of rubber reinforcing carbon black and precipitated silica.

7. The rubber composition of claim 1 which contains petroleum based rubber processing oil blended with the rubber composition in addition to said algae oil in an amount less than 50 percent of the combination of rubber processing oil and algae oil.

8. The rubber composition of claim 1 wherein at least one of said diene-based elastomers is a functionalized diene-based elastomer which contains at least one functional group comprised of at least one of amine, siloxy, carboxyl, hydroxyl and thiol reactive with hydroxyl groups contained on said precipitated silica.

9. The rubber composition of claim 1 wherein at least one of said diene-based elastomers is a tin or silicon coupled elastomer.

10. The rubber composition of claim 9 wherein said functionalized diene based elastomers is a tin coupled styrene/butadiene elastomer.

11. A tire having a component comprised of the rubber composition of claim 1.

12. A tire having a tread comprised of the rubber composition of claim 1.

13. A tire having a tread comprised of the rubber composition of claim 2.

14. A tire having a tread comprised of the rubber composition of claim 3.

15. A tire having a tread comprised of the rubber composition of claim 4.

16. A tire having a tread comprised of the rubber composition of claim 6.

17. A tire having a tread comprised of the rubber composition of claim 7.

18. A tire having a tread comprised of the rubber composition of claim 8.

19. A tire having a tread comprised of the rubber composition of claim 9.

20. A tire having a tread comprised of the rubber composition of claim 10.

* * * * *